United States Patent Office 3,719,643
Patented Mar. 6, 1973

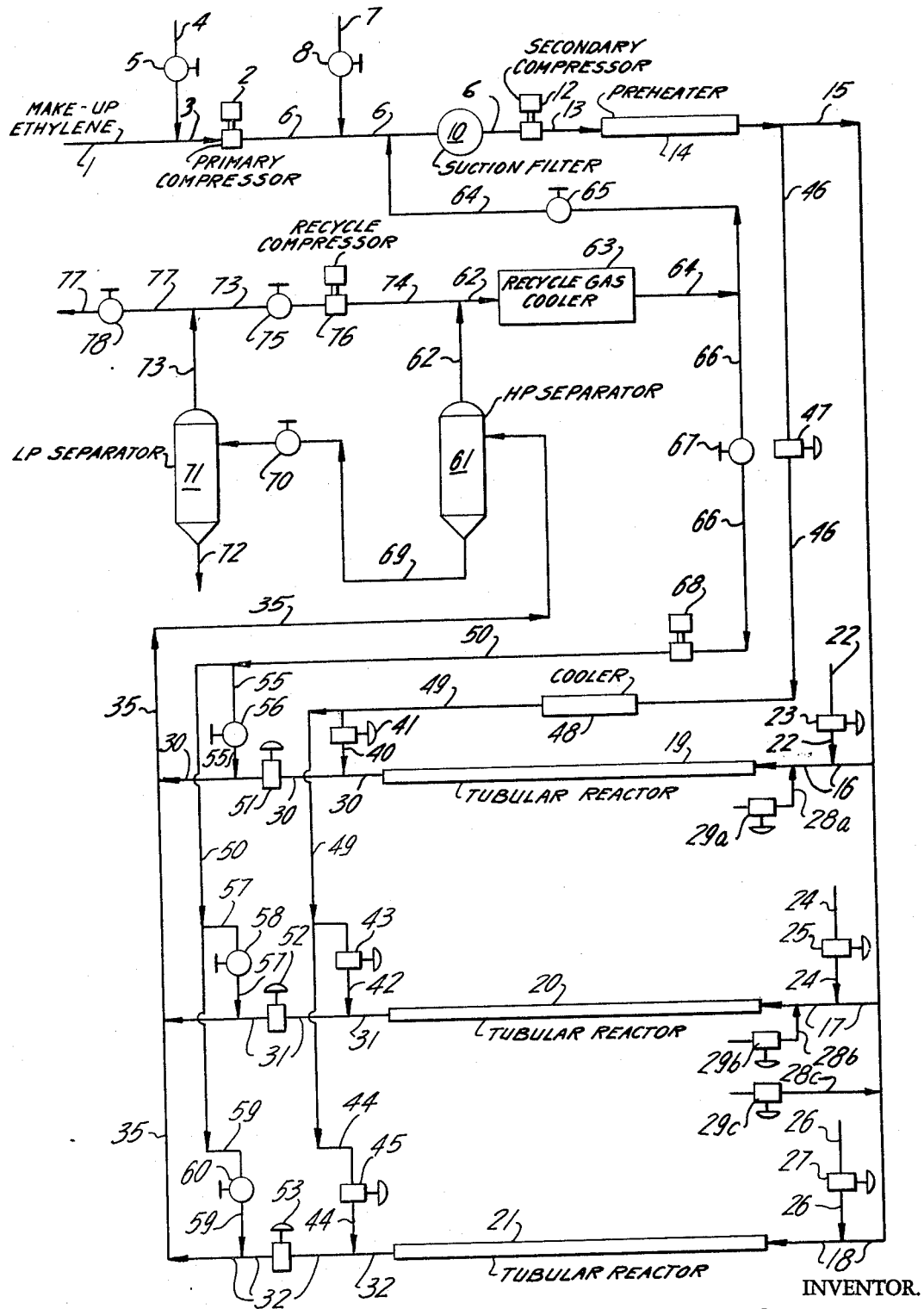

3,719,643
HIGH PRESSURE PROCESS FOR
POLYETHYLENE PRODUCTION
Ralph M. Knight, Los Angeles, Calif., assignor to Dart
Industries Inc., Los Angeles, Calif.
Filed Jan. 25, 1971, Ser. No. 109,416
Int. Cl. C08f 1/60, 3/04
U.S. Cl. 260—87.3
7 Claims

ABSTRACT OF THE DISCLOSURE

An improvement in a process for polymerizing ethylene is achieved by splitting the feed into at least two streams, continuously polymerizing each of the streams in the presence of free-radical initiator at elevated pressures and temperatures in separate reactor tubes, quenching the resulting reaction product stream, and separating and recovering polyethylene from the reaction product stream. The length of each of the reactor tubes is designed so that the reaction temperature peak occurs within the tube adjacent to the outlet and is calculated based on the following equation:

$$L = \frac{\bar{v}W(t_p - t_i)}{AR(3600)}$$

where:

$\bar{v}$ is the specific volume in units of cubic volume of ethylene feed per unit of weight,
W is the ethylene feed rate through the reactor tube in units of weight per hour,
$t_p$ is the peak temperature of the reaction,
$t_i$ is the temperature of the ethylene feed at the inlet of the reactor tube,
A is the cross-sectional area of the reactor tube in units of square length,
R is the ethylene reaction rate in units of temperature rise per second,
3600 is the constant to convert seconds to hours.

FIELD OF THE INVENTION

This invention relates to an improvement in a process for the production of polyethylene in a high pressure process employing a tubular reactor. More particularly, this invention relates to a high pressure polyethylene process employing a plurality of short reactor tubes designed to be just capable of sustaining the exothermic reaction of ethylene polymerization from the time of its initiation with a free-radical yielding catalyst until the reaction peak temperature occurs.

DESCRIPTION OF THE PRIOR ART

Each of the prior art high pressure processes for producing polyethylene employs a single jacketed, elongated tube designed not only to sustain the exothermic heat of reaction, but to provide sufficient surface area for cooling the resulting reaction product to temperatures which can be handled in the subsequent downstream processing equipment. In some of the prior art processes the elongated reactor is provided with multiple points along the length of the tube for the introduction of free-radical yielding catalysts.

U.S. Pat. No. 3,293,233 represents an example of the latter type of processes in which a plurality of peroxide initiator introduction points are distributed along the length of a single reactor tube. About six reactor blocks are required after each of the temperature peaks represented by A, C, D and F on FIGS. 1 and 2 of this patent. These reactor blocks define finite zones ranging in length from about 5 to 60 feet depending on the diameter of the reactor tubes and the velocity of the material through the tubes. Thus, it can be seen from these figures that over half of the total reactor length is designed to provide the surface area necessary to cool the reaction mixture from the peak temperature to the reactor exit temperature which is considerably less than the peak temperature. It is disclosed in this patent that the reaction products are desirably discharged from the reactor to a high pressure catchpot (separator) at a temperature of about 475° to 500° F.

SUMMARY OF THE INVENTION

In accordance with the foregoing, there is provided a process for polymerizing an ethylene feed at elevated temperatures and pressures which comprises splitting the ethylene feed into at least two streams, continuously polymerizing each of the ethylene streams in the presence of a free-radical initiator in separate reactor tubes, quenching the resulting reaction product stream, and separating and recovering polyethylene from the product reaction stream.

The quenching step takes place by contacting the reaction product stream with a cooling medium such as ethylene feed, recycle ethylene, water, an organic solvent and the like subsequent to each of the outlets of the reactor tubes. It is also contemplated that the reaction product from each tube be combined into one stream and then quenched with the cooling medium. The amount of cooling medium ranges from about 0.2 to 5 times the amount of ethylene make-up feed. The reaction product stream is cooled to a temperature below about 650° F. and preferably in the range of about 400° to 550° F.

The separation step includes high and low pressure separators in which the unreacted ethylene and other unreacted gases are removed overhead from the high pressure separator and recycled to the reactor tubes. The bottoms from the high pressure separator are passed to the low pressure separator where additional ethylene is removed from the reaction product to yield polyethylene which may be further processed as required to meet specifications.

The length of each of the reactor tubes is designed such that the reaction temperature peak occurs within the tube substantially immediately adjacent to the outlet of the tube. The length is calculated by using the following equation:

$$L = \frac{\bar{v}W(t_p - t_i)}{AR(3600)}$$

where:

$\bar{v}$ is the specific volume in units of cubic volume of ethylene feed per unit of weight,
W is the ethylene feed rate through the reactor tube in units of weight per hour,
$t_p$ is the peak temperature of the reaction,
$t_i$ is the temperature of the ethylene feed at the inlet of the reactor tube,
A is the cross-sectional area of the reactor tube in units of square length,
R is the ethylene reaction rate in units of temperature rise per second,
3600 is the constant to convert seconds to hours.

The inside diameter of each of the reactor tubes generally ranges between ½" to 2".

The reaction pressures range from at least 15,000 p.s.i. up to about 100,000 p.s.i. and the temperatures range from about 250° to 650° F. The pressures in the high pressure separator range from about 1500 to 7500 p.s.i.

The initiator for the polymerization reaction includes oxygen and the peroxides such as hydrogen peroxide, 2,4-dichlorobenzoyl peroxide, caproyl peroxide, lauroyl peroxide, t-butyl peroxyisobutyrate, benzoyl peroxide, p-chlorobenzoyl peroxide, diisopropyl peroxydicarbonate, acetyl peroxide, decanoyl peroxide, t-butyl peroxypivalate, t-butyl peroxyacetate, t-butyl peroxybenzoate, cumyl peroxide, diethyl dioxide, t-butyl hydroperoxide, methyl ethyl ketone peroxide, di-t-butyl diperoxyphthalate, hydroxyheptyl peroxide, cyclohexanone peroxide, p-menthane hydroperoxide, pinane hydroperoxide, cumene hydroperoxide, t-butyl peroxide, 2,5-dimethyl hexane-2,5 dihydroperoxide, t-butyl peroctoate, t-butyl peracetate, 1,1,3,3-tetramethyl butyl hydroperoxide, or mixtures thereof.

In addition to the ethylene feed, a comonomer in amounts ranging from 0.1 to 20 mole percent of the ethylene feed may be employed. Illustrative examples of such comonomers include alpha-olefins such as propylene, butenes and pentenes; vinyl acetate; and ketones such as acetone and the like. A chain transfer agent can also be introduced into the polymerization system with the feed in amounts ranging from 0.01 to 5 mole percent of the ethylene feed. The chain transfer agent includes, for example, hexane or butane or a comonomer such as propylene which also functions as a chain transfer agent. The addition of a comonomer and/or a chain transfer agent permits one to vary the physical properties of the polyethylene products as is well-known in the art. However, by means of this invention one can vary the type and/or amount of the comonomer and/or chain transfer agent introduced into each of the separate reactor tubes to directly obtain products having a broader range of molecular weight distribution than is possible in the prior art processes.

BRIEF DESCRIPTION OF THE DRAWING

The process of the present invention will be more readily understood from the following description when read in conjunction with the accompanying drawing in which a process flow diagram of a preferred embodiment is depicted.

DESCRIPTION OF THE PREFERRED EMBODIMENT

Referring now to the drawing, make-up ethylene is introduced via line 1 into primary compressor 2 from a source not shown. If desired, comonomer make-up can be introduced into the polymerization system at line 3 by line 4 and control valve 5. The preferred type of comomers include propylene, butene-1, vinyl acetate and mixtures thereof. In addition, a chain transfer agent or modifier can be introduced into the system at line 6 via line 7 and control valve 8. The compressed feed is passed through line 6 and suction filter 10 into secondary compressor 12. The compressed feed then discharges via line 13 into preheater 14 which heats the feed to the desired temperature for polymerization. The feed at the proper polymerization temperature is introduced via line 15 through lines 16, 17 and 18 into the inlets of tubular reactors 19, 20 and 21, respectively. Initiator is introduced into lines 16, 17 and 18 by line 22 and control valve 23, line 24 and control valve 25, and line 26 and control valve 27, respectively.

Chain transfer agents can be introduced into lines 16, 17 and 18 by line 28a and control valve 29a, line 28b and control valve 29b and line 28c and control valve 29c, respectively. This gives one the flexibility of introducing different chain transfer agents and/or amounts of such agents into each of the tubular reactors 19, 20 and 21.

Each of reactors 19, 20 and 21 are designed so that the length of each of the tubes is just sufficient to sustain the polymerization reaction as described in the summary above. Reactors 19, 20 and 21 can be provided with heating and cooling jackets (not shown). As is well known in the prior art, hot and cold water is generally supplied to such jackets to serve to a limited extent to control the rapid temperature rise in each of the reactors. However, one of the advantages of the present invention is to carry out the polymerization in a plurality of short reactors instead of one long, jacketed reactor as in the prior art. Because the reactors are kept short, in most cases less than 400 feet, preferably 200 to 300 feet and quenched adjacent to the outlet, they can be operated adiabatically without the use of jackets for heat removal. After the peak temperature has been reached in each of the tubular reactors, the reaction product streams are withdrawn via lines 30, 31 and 32 and combined into a common line 35. A cooling medium can be introduced adjacent the outlet of reactors 19, 20 and 21 via line 40 and control valve 41, line 42 and control valve 43, and line 44 and control valve 45, respectively. The cooling medium in this case is ethylene feed that is passed through line 46 and valve 47 to cooler 48 where it is reduced to a temperature within the range of about 0° to 100° F., preferably 50° to 90° F. The cooled ethylene stream is then passed to lines 40, 42 and 44 via line 49 to quench each of the reaction product streams. In order to conserve on the capacity of the compressor, it is preferred that the cooled ethylene stream be passed through line 50 into lines 30, 31 and 32 after the high pressure letdown valves 51, 52 and 53, via line 55 and control valve 56, line 57 and control valve 58, and line 59 and control valve 60, respectively.

The combined reaction product stream from reactor tubes 19, 20 and 21 is introduced via line 35 into high pressure separator 61. The gaseous ethylene is withdrawn overhead from the high pressure separator via line 62 of the recycle gas cooler 63 where it is reduced in temperature within the range of about 0° to 100° F. The cooled ethylene is discharged from recycle cooler 63 by line 64 and passed through valve 65 into suction filter 10. A portion of the cooled ethylene may be passed through line 66 and valve 67 to compressor 68 where the ethylene is compressed to a sufficient degree to be added to the system. The compressed ethylene from compressor 68 is passed through line 50 and split into lines 55, 57 and 59.

After separation of the ethylene from the polyethylene from the high pressure separator 61, the reaction product is withdrawn by line 69 and passed through low pressure letdown valve 70 into low pressure separator 71 which operates at about 0 to 15 p.s.i.g. The ethylene homopolymer or copolymer product is withdrawn from low pressure separator 71 by line 72. The ethylene from low pressure separator 71 is discharged overhead via line 73 and valve 75 into a recycle compressor 76. The compressed gas is passed through line 74 and combined with high pressure separator overhead in line 62 for recycle through the system. Alternately, all of a portion of the gas may be discharged from the system by line 77 by opening valve 78.

The following examples illustrate the process of the present invention and some of the advantages derived therefrom:

EXAMPLE 1

In a polymerization process in accordance with the drawing, ethylene feed at a rate of 5600 lbs./hr. is separated into three streams and passed through lines 16, 17 and 18 into tubular reactors 19, 20 and 21, each having an inside diameter of ⅝". The ethylene feed is polymerized at a pressure of 20,500 p.s.i. in the presence of an initiator solution comprising a mixture of peroxides dissolved in a solvent, e.g., hexane, which is introduced via lines 22, 24 and 26 into the reactor feed lines 16, 17 and 18 at the rate of about 50 ml./min. for each reactor. The temperature of the ethylene feed at the inlet is about 340° F. and the reactor peak temperature immediately adjacent to the outlet of each of the reactors is about 640° F. The reaction product from each reactor is reduced to 4000 p.s.i. in high pressure letdown valves 51, 52 and 53. About 940 lbs./hr. of ethylene recycle gas at a temperature of 50° F. in line 50 are divided into thirds and introduced into lines 30, 31 and 32 via lines 55, 57 and 59, respectively. The combined reaction product mixture and ethylene recycle is estimated to contain about 940 lbs./hr. of polyethylene and 5600 lbs./hr. of ethylene at a temperature of about 540° F. The combined stream is withdrawn by line 35 and passed to high pressure separator 61. The 940 lbs./hr. of polyethylene product having a high melt index, e.g., about 45 gms./10 min., is recovered from low pressure separator 71 via line 72 for conversion of about 16.8 weight percent.

In this example the length of each reactor is about 109 ft. The ethylene reaction rate, R, can be calculated based on the information of this example by the following equation:

$$R = \frac{\bar{v}W(t_p - t_i)}{AL(3600)}$$

$$= \frac{(0.037 \text{ ft.}^3/\text{lb.}) \frac{(5600 \text{ lbs./hr.})}{3} (640-340)° \text{ F.}}{(0.00213 \text{ ft.}^2)(109 \text{ ft.})(3600 \text{ sec./hr.})}$$

$$= 25° \text{ F./sec.}$$

EXAMPLE 2

In another example in accordance with the drawing, make-up ethylene is fed to primary compressor 2 where it is compressed to 4500 p.s.i. and combined via line 7 with a chain transfer modifier comprising about 0.2 mole percent propylene based on the total ethylene feed rate of 5600 lbs./hr. The make-up ethylene containing the modifier is combined with the recycle ethylene in line 64 and passed through suction filter 10, secondary compressor 12 and preheater 14. The total feed at a pressure of 35,000 p.s.i. and about 355° F. is divided into three streams and polymerized in reactors 19, 20 and 21 in the presence of a different initiator solution than employed in Example 1, which initiator solution is introduced at a rate of 39 ml./min. reactor. The reaction product is discharged from each of the reactors at the peak temperature of about 565° F. The reaction product is heated to a temperature of about 650° F. because of the reverse Joule-Thomson effect when the pressure is reduced to 4000 p.s.i. in the letdown valve. Therefore, about 1120 lbs./hr. of recycle ethylene at 50° F. is required to reduce the reaction product to a temperature of 540° F. The estimated polyethylene product having a low melt index, e.g., about 2 gms./10 min., that is recovered from line 72 is about 595 lbs./hr. for a conversion of about 10.6 weight percent.

The ethylene reaction rate for this example based on a reactor length of about 22 ft. is calculated from the equation as follows:

$$R = \frac{\bar{v}W(t_p - t_i)}{AL(3600)}$$

$$= \frac{(0.031 \text{ ft.}^3/\text{lb.}) \frac{(5600 \text{ lbs./hr.})}{3} (565-355)° \text{ F.}}{(0.00213 \text{ ft.}^2)(22 \text{ ft.})(3600 \text{ sec./hr.})}$$

$$= 72° \text{ F./sec.}$$

The above examples suggest the great flexibility one has in operating a high pressure polyethylene process in accordance with the teachings of the present invention. One can use a different type and/or amount of initiator and even a different inlet temperature in each reactor tube to obtain wide variations in both the ethylene polymerization reaction rate and the peak temperature. From the equation of the Summary, one can calculate the effect variations in the inlet temperature and the reaction rate has on the peak temperature if all other variables are maintained constant. In the calculations below a commercially feasible operation is assumed in which the ethylene feed rate is 25,000 ft./hr. for each reactor, the length of the reactor is 200 ft., the inside diameter of the reactor is 1 inch, and the specific volume is 0.0314 ft.³/lb. based on a pressure of 35,000 p.s.i. and an average reactor temperature of 455° F. (assumed to be constant for purposes of the calculation):

$$t_p = \frac{AL(3600)}{\bar{v}W} R + t_i$$

$$= \frac{(0.0054 \text{ ft.}^2)(200 \text{ ft.})(3600 \text{ sec./hr.})}{(0.0314 \text{ ft.}^3/\text{lb.})(25,000 \text{ lb./hr.})} R + t_i$$

$$= 4.95 R + t_i$$

The peak temperature ranges for this set of conditions from about 425° F. to about 660° F. for an inlet temperature of 300° F. and for the calculated reactions rates of 25° F./sec. and 72° F. sec. of Examples 1 and 2, respectively. Since an increase in peak temperature results in an increase in melt index, it can be seen that the present process permits one to directly obtain a final product which has a broad molecular weight distribution by blending products of different melt indices from each reactor.

EXAMPLE 3

This example illustrates another important aspect of the method of this invention which is the flexibility of being able to introduce varying amounts of chain transfer modifiers into each reactor to obtain a final polyethylene product which is a melt blend of the individual products of varying properties from each reactor.

An ethylene feed at a pressure of 35,000 p.s.i. and a temperature of 365° F. is divided into 3 streams of 25,000 lbs./hr. each and polymerized in reactors 19, 20 and 21 in the presence of an initiator solution and a propylene chain transfer modifier. The propylene modifier in an amount of 2.5 mol. percent based on the ethylene feed is introduced into reactors 19 and 20 via line 28a and control valve 29a and line 28b and control valve 29b, respectively. Propylene modifier in an amount of 0.8 mol. percent is introduced into reactor 21 via line 28c and control valve 29c. The reaction product is discharged from reactors 19 and 20 at a peak temperature of about 570° F. and is discharged from reactor 21 at a peak temperature of about 590° F. The reaction product from each of the reactors is cooled to less than 550° F. by cold recycle ethylene to compensate for the reverse Joule-Thomson effect when the pressure of the reaction product is reduced in the letdown valve. The estimated polyethylene products removed from reactors 19 and 20 have a high melt index, e.g., about 30 gms./10 min. and the estimated product from reactor 21 has a low melt index, e.g., about 1 gm./10 min. Thus, the approximate melt index for the melt blended polyethylene product recovered from line 72 is 12 gms./10 min.

Example 3 illustrates the effect a variation in the amount of chain transfer modifier introduced into each reactor has on the melt index of the final product. One can also vary the type of modifiers that can be introduced into each of the reactors to obtain an even more dramatic difference in the physical properties, especially in melt index, of the individual streams from each of the reactors. Thus, the final melt blended product that is recovered has a wide molecular weight distribution.

The versatility to be able to produce a product of such wide molecular weight distribution has significant commercial advantages. Polyethylene products having a broad molecular weight distribution have better melt strength for blow molding applications, higher impact strength for blown film extrusion applications and improved processability and less tendency to "neck-in" at the die head in extrusion coating applications than products having a narrower molecular weight distribution.

If all of the reactors are operated at the same optimum conditions, one can obtain maximum conversion of ethylene to polyethylene which has a narrower molecular distribution than obtainable in the prior art reactors. The production of a narrow molecular weight product in each reactor occurs in the present process because the pressure and the peak temperature that is reached in each reactor is immediately reduced subsequent to each reactor as described above. This operation substantially eliminates the tendency for competing side reactions that occur in a single jacketed, tubular reactor where the reaction product is slowly cooled by the circulation of a cooling medium in the jacket while at the reaction pressure. Such uncontrolled side reactions produce polymers of a variety of molecular weight including high molecular weight, cross-linked gels which are very detrimental to the final product. Narrow molecular weight polyethylene products result in high stress-crack resistant materials useful in many blow-molding applications and in blow film applications where improved optical properties are important.

One can isolate the feed to each of the reactors to prevent a buildup in the concentration of the modifier in any of the reactors. For example, secondary compressor 12 can be divided into various sections and a major portion of the fresh feed can be compressed in a section and passed through separate feed lines to any of the reactors that one wishes to maintain at a low or negligible modifier concentration. Alternatively, auxiliary facilities can be provided to reduce the recycle stream to a low or negligible modifier concentration. For example, the ethylene recycle in line 64 can be diverted to a stripper or other suitable equipment (not shown in the drawing) to strip out the modifier before the recycle is passed into suction filter 10.

It is obvious from the foregoing that many other variations can be made in the operation of the process of this invention employing the short multi-tubular reactors. All such variations falling within the scope of this invention can be made without departing from the scope of the appended claims.

What is claimed is:

1. A process for polymerizing an ethylene feed at pressures in the range of 15,000 p.s.i. to 100,000 p.s.i. and at temperatures in the range of about 250° to about 650° F. which comprises:
   (a) splitting said ethylene feed into at least two streams,
   (b) continuously polymerizing each of the ethylene streams in the presence of a free-radical peroxide initiator at said pressures and temperatures under adiabatic conditions in separate reactor tubes having inside diameters in the range from about 0.5 to about 2 inches, each of said reactor tubes having an inlet to receive said ethylene feed and an outlet and being of a length such that the reaction temperature peak occurs within said tube substantially immediately adjacent to said outlet, said length being calculated based on the following equation:

$$L = \frac{\bar{v}W(t_p - t_i)}{AR(3600)}$$

where:
   $\bar{v}$ is the specific volume in units of cubic volume of said ethylene feed per units of weight,
   W is the ethylene feed rate in units of weight per hour,
   $t_p$ is the reaction temperature peak,
   $t_i$ is the temperature of said ethylene feed at said inlet,
   A is the cross-sectional area of the reactor tube in units of square length,
   R is the ethylene reaction rate in units of temperature rise per second, and
   3600 is the constant to convert seconds to hours,
   (c) quenching the resulting reaction product stream subsequent to each of said outlets with a cooling medium to a temperature below 650° F. by introducing said medium directly into said product stream, and
   (d) separating and recovering polyethylene from said reaction product stream.

2. The process of claim 1 wherein said reaction product stream is cooled with said cooling medium immediately after the pressure is reduced to in the range of about 1500 to 7500 p.s.i.

3. The process of claim 1 wherein said cooling medium is ethylene separated from said reaction product mixture and cooled to a temperature in the range of about 0° to 100° F.

4. The process of claim 1 wherein polyethylene is separated from ethylene in a high pressure and a low pressure separator and recovered from the low pressure separator.

5. The process of claim 1 wherein the ethylene feed contains a comonomer.

6. A process for polymerizing an ethylene feed at pressures in the range of 15,000 p.s.i. to 100,000 p.s.i. and at temperatures in the range of about 250° to about 650° F. which comprises:
   (a) splitting said ethylene feed into at least two streams,
   (b) continuously polymerizing each of the ethylene streams in the presence of a free-radical peroxide initiator at said pressures and temperatures in separate reactor tubes having inside diameters in the range from about 0.5 to about 2 inches, each of said reactor tubes having an inlet to receive said ethylene feed and an outlet and being of a length such that the reaction temperature peak occurs within said tube substantially immediately adjacent to said outlet, said length being calculated based on the following equation:

$$L = \frac{\bar{v}W(t_p - t_i)}{AR(3600)}$$

where:
   $\bar{v}$ is the specific volume in units of cubic volume of said ethylene feed per units of weight,
   W is the ethylene feed rate in units of weight per hour,
   $t_p$ is the reaction temperature peak,
   $t_i$ is the temperature of said ethylene feed at said inlet,
   A is the cross-sectional area of the reactor tube in units of square length,
   R is the ethylene reaction rate in units of temperature rise per second, and
   3600 is the constant to convert seconds to hours,
wherein at least one of said ethylene streams is polymerized at one set of operating conditions and at least the other ethylene stream is polymerized at another set of operating conditions, all of the streams being polymerized under adiabatic operating conditions,
   (c) quenching each of the resulting reaction product streams containing polyethylene products of differing physical properties subsequent to each of said outlets with a cooling medium to a temperature below 650° F. by introducing said medium directly into said reaction product stream,
   (d) combining each of the quenched reaction product streams, and
   (e) separating and recovering polyethylene from the combined reaction product stream.

7. A process for polymerizing an ethylene feed at pressures in the range of 15,000 p.s.i. to 100,000 p.s.i. and at temperatures in the range of about 250° to about 650° F. which comprises:
   (a) splitting said ethylene feed into at least two streams,
   (b) introducing a chain transfer modifier into at least one of said ethylene streams,
   (c) continuously polymerizing each of the ethylene streams in the presence of a free-radical peroxide initiator at said pressures and temperatures in separate reactor tubes having inside diameters in the range from about 0.5 to about 2 inches, each of said reactor tubes having an inlet to receive said ethylene feed and an outlet and being of a length such that the reaction temperature peak occurs within said tube substantially immediately adjacent to said outlet, said length being calculated based on the following equation:

$$L = \frac{vW(t_p - t_i)}{AR(3600)}$$

where:
$\bar{v}$ is the specific volume in units of cubic volume of said ethylene feed per units of weight,
W is the ethylene feed rate in units of weight per hour,
$t_p$ is the reaction temperature peak,
$t_i$ is the temperature of said ethylene feed at said inlet,
A is the cross-sectional area of the reactor tube in units of square length,
R is the ethylene reaction rate in units of temperature rise per second, and
3600 is the constant to convert seconds to hours, wherein at least one of said ethylene streams is polymerized at one set of operating conditions and at least the other ethylene stream is polymerized at another set of operating conditions, all of the streams being polymerized under adiabatic operating conditions, (d) quenching the resulting reaction product stream subsequent to each of said outlets by introducing said medium directly into said reaction product stream, (e) combining each of the quenched reaction product streams, and (f) separating and recovering polyethylene from the combined reaction product stream.

References Cited

UNITED STATES PATENTS

| | | | |
|---|---|---|---|
| 2,868,762 | 1/1959 | Oakes | 260—897 A |
| 3,509,115 | 4/1970 | French | 260—87.3 |
| 3,336,281 | 8/1967 | Eilbracht et al. | 260—94.9 R |

JOSEPH L. SCHOFER, Primary Examiner

A. HOLLER, Assistant Examiner

U.S. Cl. X.R.

260—80.78, 88.2 B, 94.9 P, 94.9 R, 897 A